Figure 1:
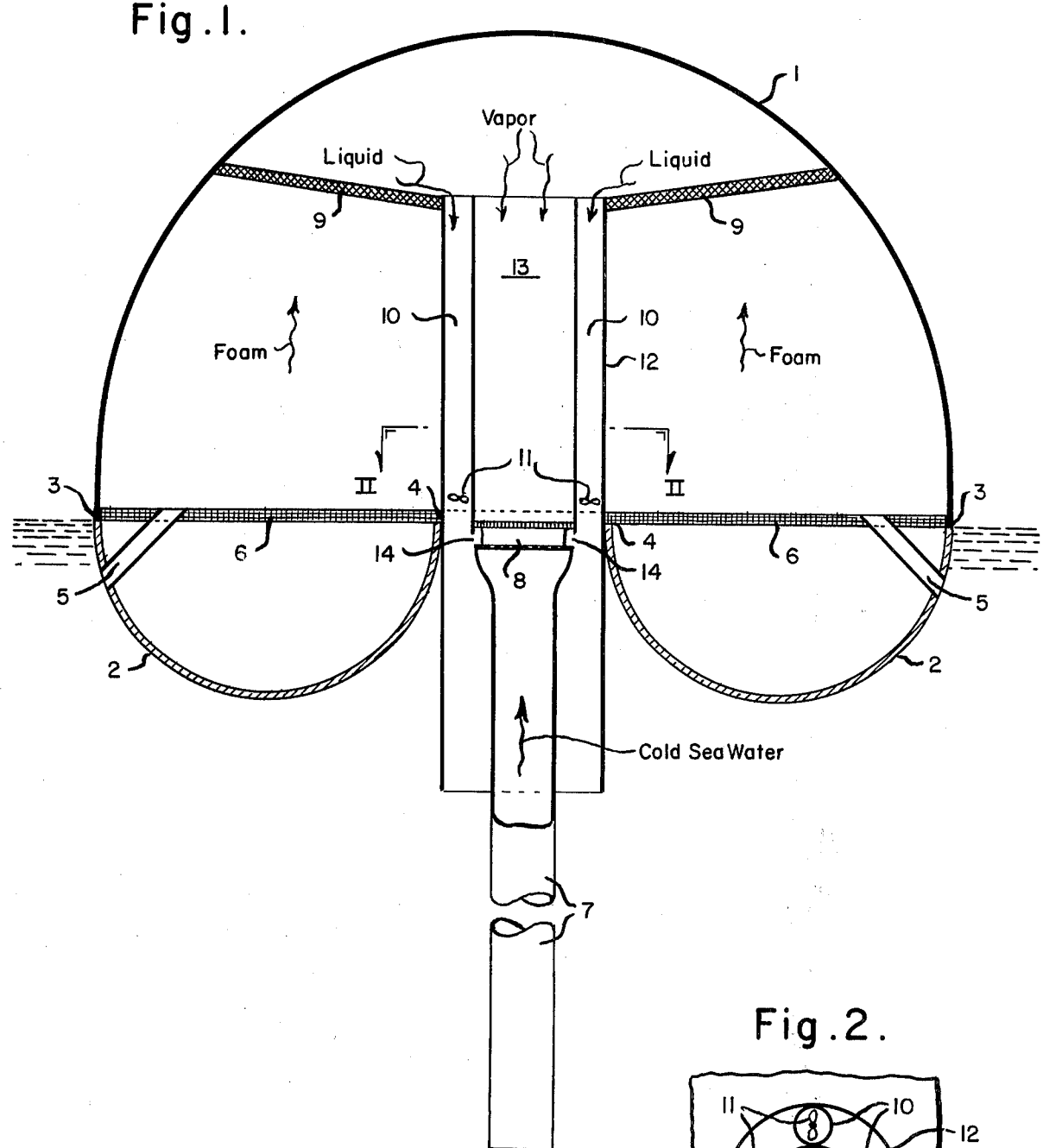

Zener et al.

United States Patent [19]

[11] 3,995,160

[45] Nov. 30, 1976

[54] METHOD AND APPARATUS FOR OBTAINING ELECTRICAL POWER FROM SEA WATER

[75] Inventors: Clarence Zener, Ligonier; John G. Fetkovich, O'Hara Township, both of Pa.

[73] Assignee: Carnegie-Mellon University, Pittsburgh, Pa.

[22] Filed: May 6, 1975

[21] Appl. No.: 575,089

[52] U.S. Cl. .................................. 290/1 R; 60/641
[51] Int. Cl.² ........................................... F02G 1/00
[58] Field of Search ..................... 60/641; 290/1, 8

[56] References Cited
UNITED STATES PATENTS
2,006,985   7/1935   Claude et al. ......................... 60/641
3,805,515   4/1974   Zemer ................................... 60/641

*Primary Examiner*—James R. Scott
*Assistant Examiner*—John W. Redman
*Attorney, Agent, or Firm*—Buell, Blenko & Ziesenheim

[57] ABSTRACT

A method and apparatus for producing electricity utilizing a foam formed from ocean water at ambient temperatures. The method and apparatus utilize the enthalpy released by a rising foam to generate the power to drive a turbine for power export.

10 Claims, 2 Drawing Figures

U.S. Patent   Nov. 30, 1976   3,995,160

METHOD AND APPARATUS FOR OBTAINING ELECTRICAL POWER FROM SEA WATER

This invention relates to a method and apparatus for producing useful electrical power from the temperature differentials in the oceans and particularly producing such power from the enthalpy released from a rising foam generated from the ocean water. The method and apparatus of the present invention greatly increase the efficiency and thereby reduce the cost of the production of useful electric power from ocean water. The present invention provides a comparatively inexpensive and substantially pollution free method and apparatus for producing electric power. In addition, the method and apparatus do not demand large quantities of natural resources that are in limited supply.

Various other schemes for utilizing the world's ocean water to obtain useful electrical power have been proposed. As early as 1881, D'Arsonval proposed using the warm upper layer of the tropical ocean as a heat source, and the cold deep water as a heat sink. In order to avoid very large turbines operating on the low vapor pressure of water of ambient temperature, he envisioned using a working medium with a moderate vapor pressure at ambient temperature, such as ammonia. This working medium operated in a closed cycle, absorbing heat from the warm surface water, rejecting heat to the cold deep water. The difficulty with this scheme is the excessive cost of the heat exchangers. A later proposal was made to extract power from the temperature differential in the tropical oceans using an open cycle power plant. The primary difficulty with this scheme has been the need for a large, low pressure turbine. A recent proposal by Earl J. Beck for a second type of open cycle power plant to utilize the tropical ocean's temperature differential, contemplates the use of water vapor in the place of air in a lift pump to lift liquid water above a static pressure head. To date, none of these proposals have been reduced to practical, economical or efficient operation.

The method and apparatus of the present invention permit the maximum utilization of the enthalpy potential of warm ocean water either as a static liquid pressure head or in the form of kinetic energy. The present invention utilizes the physical structure and the thermodynamic and mechanical properties of a foam formed from ocean water at ambient temperatures.

Foam is a mixture of liquid and vapor in which the overwhelming volume percentage is in the vapor phase and the overwhelming mass percentage is in the liquid phase. In the foam the vapor is contained in cells bounded by a liquid film wherein the bulk of the liquid is contained at the corners of these cells.

The creation of a foam from ocean water occurs when the pressure of ocean water at ambient temperature and saturated vapor pressure is lowered to a value characteristic of saturated vapor pressure at a lower temperature and a foam inducing agent such as water vapor is added. The physical properties of the foam allows a maximum utilization of the enthalpy potential. This utilization can take the form of either a static head of the liquid separated from the foam or of the kinetic energy of the foam itself. This release of enthalpy is converted into electrical power. In a foam any motion of the vapor phase is accompanied by motion of the liquid phase. Therefore, the height to which the vapor rises causes a corresponding rise of the liquid. The maximum potential and kinetic energy of a foam can be calculated from well known and understood formulas.

In a preferred embodiment of our invention, we provide a dome like structure to separate and insulate the interior of the plant from atmospheric pressure. The dome has a radius of about 600 feet or less and can be made of reinforced concrete or the like, with a wall thickness of about 1.9 feet or less. The dome is supported by a buoyant structure which supports the dome on its outer rim. The inner rim of the buoyant structure supports the operational machinery such as the turbines and the internal piping of sea power generator. Inlet means are provided through the buoyant structure to permit transfer of the surface water into the dome and onto the surface of a foam generating means. A foam breaker for separating the vapor and liquid phases of the foam is set at approximately 575 feet or less depending on the dome radius above the surface of the foam generating surface. Means are provided for transport of the liquid separated from the foam to the turbines which are at approximately the level of the foam generating means. Means are also provided for collection and transport of the vapor to a condenser. The coolant for the condenser is brought up from the deep ocean water by means of a conduit extending from the supporting structure into the deeper water. The exhaust liquid from the condenser and the condensed vapor are pumped through exhaust ports to the ocean.

In operation the colder deep ocean water is drawn through a conduit into a condenser at approximately sea level. Warmer surface water is drawn into the dome through inlet ports and transported to foam generating means. The higher temperature surface water and the lower temperature deep ocean water are now in proximity of each other in the closed environment. The presence of the higher temperature and lower temperature water in the closed environment of the dome results in pressure gradients within the dome and also reduces the pressure of the warmer water to a value below its saturation vapor pressure. This decrease below the saturation vapor pressure causes the warmer water to evaporate. A foam inducing medium is introduced by a foam forming means into the warmer water and causes the formation of a foam. As a result of the pressure gradients, the foam flows toward the colder water zones of the dome and comes into contact with the foam separator means where the liquid phase and vapor phase are separated. The liquid phase is then transported by conduit means to the turbine and the vapor phase is transported to the condenser and both are pumped through exhaust ports to the ocean.

Electricity is produced by using the various physical, thermodynamic and mechanical properties of ocean water foam. Higher temperature surface water at its saturation vapor pressure is brought into a closed environment with colder deep ocean water. A foam inducing medium is introduced into the warm water and a foam generated. The foam rises to a point above the static head of a turbine where the liquid and vapor phases of the foam are separated. Turbines are driven by the liquid phase which is expelled to the ocean through the turbine and the vapor phase is condensed by the colder water and also returned to the ocean. Electricity is produced by a generator driven by the turbines. In the foregoing general description, we have set out certain purposes, objects and advantages of our invention.

Figure 2:
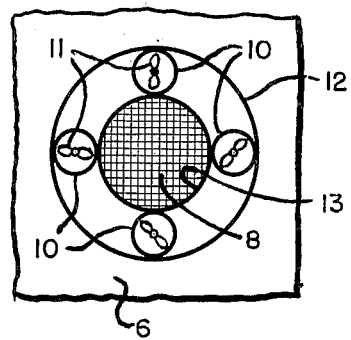

It will be described hereafter and will become apparent for those skilled in the art of electrical power generation when considering the following description and drawings in which:

FIG. 1 is a schematic view of the electrical power generating plant of this invention; and FIG. 2 is a partial section taken on line 2—2 of FIG. 1.

Referring to the drawings we have illustrated in FIG. 1, a foam of an electrical generating plant of the present invention utilizing the physical, thermodynamic and mechanical properties of a foam generated from ocean water. Dome 1 constructed of reinforced concrete has a wall thickness of 1.9 feet and a radius of 600 feet. A dome of this construction can withstand atmospheric pressure without crushing or buckling. Dome 1 is supported by buoyant structure 2. Structure 2 is made of steel and contains a vapor to provide buoyancy. Dome 1 engages edge 3 of structure 2 so as to seal the interior of the dome from atmospheric pressure. Edge 4 of structure 2 supports the various conduits and operational equipment of the plant.

Intake ports 5 carry warm surface water into the dome and onto a foam generating means 6. The foam generating means consists of a source of water vapor provided to the warm surface water through a plurality of minute orifices. Cold deep water is carried into the dome through pipe 7 to the level of condenser 8. Pipe 7 extends through the center of structure 2 from a point below the surface of the ocean. Foam separator 9 is supported by structure 2 at approximately 550 feet above the foam generator 6. The foam breaker can be a turbine fan which centrifically separates the vapor and liquid phases of the foam. The liquid is then carried through conduits 10, FIG. 2, to drive turbines 11. Conduits 10 are enclosed in shield 12 to preserve the stream-line upward flow of the foam. The separated vapor phase is carried by conduit 13 to condenser 8 where it is condensed by means of the cold deep water. The exhaust liquid from the turbine and the recondensed vapor are then exhausted through ports 15 to the ocean. The recondensed vapor can either be pumped or driven by entrainment into exhaust 14. Exhaust means through the dome can be provided for the air which results from the separation of the foam.

In operation the warmer surface water would be conducted into the closed environment of the dome through intakes 5 onto foam generating means 6 and colder deep water would be conducted to the condenser through pipe 7. The presence of the warmer and colder water at saturated vapor pressure in the closed environment isolated from atmospheric pressure results in evaporation of the warmer water. Water vapor is introduced into the warmer water through a plurality of small orifices by the foam generating means 6. The pressure gradients within the dome causes the vapor to rise and contact foam separator 9. The liquid and vapor phases are separated and the liquid is used to propel turbines 11 and then is exhausted to the ocean. The vapor is condensed by condenser 8 and also exhausted to the ocean. The energy of the rotating turbines is converted to electrical energy by a generator, not shown.

If the enthalpy potential were utilized in the form of kinetic energy the rising foam would not be separated but would be conducted to the turbines directly and then the vapor phase would be condensed for exhaustion with the liquid to the ocean.

Thus, electric energy is provided efficiently and economically without pollution or the use of large quantities of limited natural resources.

In the foregoing specification we have set out certain preferred embodiments of our invention, however, it will be understood that this invention may be otherwise embodied within the scope of the following claims.

We claim:

1. A method of producing electrical energy comprising the steps:
   a. conducting warm ocean water into a closed environment isolated from atmospheric pressure onto a foam generating means,
   b. conducting colder ocean water into said closed environment,
   c. generating a foam in the evaporating warmer water,
   d. separating said foam into liquid and vapor phases,
   e. conducting said liquid phase to turbine means,
   f. conducting said vapor phase to a condenser for condensing said vapor; and
   g. exhausting said liquid and condensed vapor to the ocean.

2. The method of claim 1 wherein the foam is generated by means of water vapor introduced through a plurality of minute orifices in said evaporating warmer water.

3. The method of claim 1 wherein said foam is separated centrifically by means of a turbine fan.

4. A method of producing electrical energy comprising the steps:
   a. conducting warm ocean water into a closed environment isolated from atmospheric pressure onto a foam generating means,
   b. conducting colder ocean water into said closed environment,
   c. generating a foam in the evaporating warmer water
   d. conducting said foam to a turbine
   e. exhausting said foam from said turbine to a condenser means; and
   f. exhausting the liquid of said foam and the condensed vapor of said foam to the ocean 5. A plant for generating electric power comprising a dome, buoyant support means for said dome, said support means engaging said dome to isolate the interior of said dome from the atmosphere, intake means for conducting warm ocean water into said dome and onto foam generating means, conduit means to conduit colder ocean water into the closed environment within said dome, foam separator means supported by said support means above said foam generator means, conduit means within said dome and supported by said structure for conducting the liquid phase of said foam to a turbine, conduit means within said dome and supported by said structure for conducting the vapor phase of said foam to condenser means; and exhaust means for returning said liquid and condensed vapor to the ocean.

6. The plant of claim 4 wherein the dome is made of reinforced concrete with a wall thickness of 1.9 feet.

7. The plant of claim 4 wherein the dome has a radius of 600 feet and the foam separator means is located 550 feet above the foam generating means.

8. The plant of claim 6 wherein the foam separator means is a turbine fan.

9. The plant of claim 4 wherein the condenser is a direct contact spray condenser.

10. A plant for generating electric power comprising a dome, buoyant support means for said dome, said support means engaging said dome to isolate the interior of said dome from the atmosphere, intake means for conducting warm ocean water into said dome and onto foam forming means, conduit means to conduct colder ocean water into the closed environment within said dome, conduit means within said dome and supported by said structure for conducting the foam to a turbine, conduit means for transporting said foam from said turbine to condenser means; and conduit means for returning the liquid phase of said foam and the condensed vapor from said foam to the ocean.

* * * * *